United States Patent [19]

Jedlicka

[11] 4,229,951  
[45] Oct. 28, 1980

[54] FLEXIBLE COUPLING

[75] Inventor: Daniel M. Jedlicka, Bloomington, Ill.

[73] Assignee: Caterpillar Tractor Co., Peoria, Ill.

[21] Appl. No.: 939,640

[22] Filed: Sep. 1, 1978

[51] Int. Cl.³ .............................................. F16D 3/64
[52] U.S. Cl. ........................................ 64/14; 64/16; 64/27 NM
[58] Field of Search .................... 123/11 R, 15 R, 14, 123/16, 27 NM

[56] References Cited

U.S. PATENT DOCUMENTS

| 709,992 | 9/1902 | Mather | 64/16 |
|---|---|---|---|
| 1,224,286 | 5/1917 | Dontje | 64/16 |
| 2,608,839 | 9/1952 | Chilton | 64/14 |
| 2,899,808 | 8/1959 | Berens | 64/14 |
| 2,943,464 | 7/1960 | Voges | 64/14 |
| 2,951,354 | 9/1960 | Anderson | 64/14 |
| 3,055,195 | 9/1962 | Olson | 64/15 R |
| 3,724,239 | 4/1973 | Calisteat | 64/11 R |
| 3,879,959 | 4/1975 | Clampett | 64/14 |

FOREIGN PATENT DOCUMENTS 582463 11/1946 United Kingdom .................... 64/11 R
1503110 3/1978 United Kingdom ........................ 64/14

OTHER PUBLICATIONS

R. R. Grundtner, "Couplings", Dec. 18, 1969, *Machine Design*, pp. 60–65.

*Primary Examiner*—Ira S. Lazarus
*Attorney, Agent, or Firm*—Charles E. Lanchantin, Jr.

[57] ABSTRACT

A flexible coupling (10) includes a resilient body (12) for transferring torque and compensating for angular misalignment between first and second shaft members (14,16). A first pair of arms (28) connects the first shaft member (14) interlockingly to the resilient body (12) at one end (20) thereof, a second pair of arms (30) connects the second shaft member (16) interlockingly to the resilient body (12) at the other end (22), and first and second retaining members (32,34) releasably couple the resilient body (12) respectively to the first and second pairs of arms (28,30) at the opposite ends (22,20). Preferably, the resilient body (12) is of elastomeric material strengthened by a plurality of internal metal reinforcement members (86).

6 Claims, 6 Drawing Figures

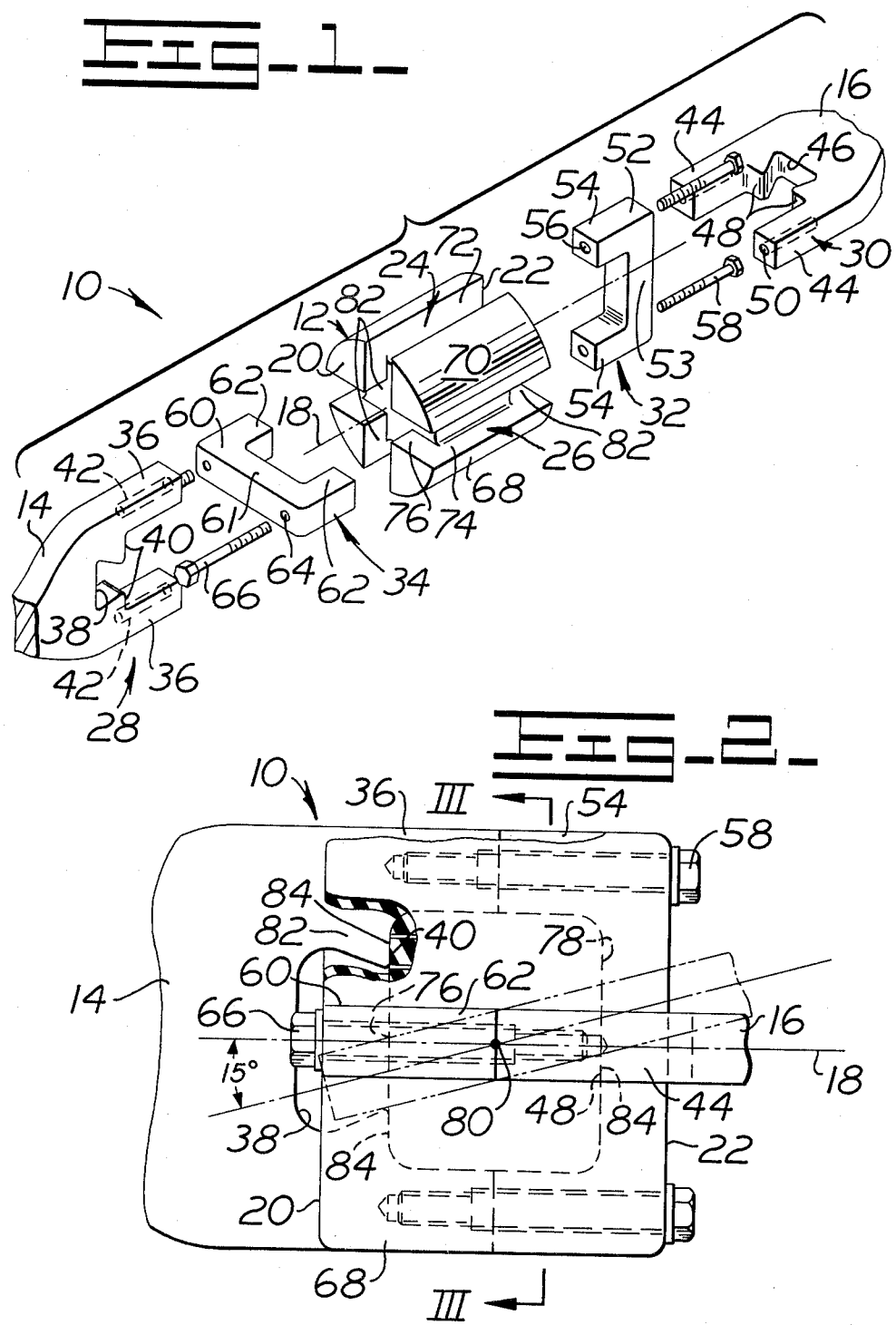

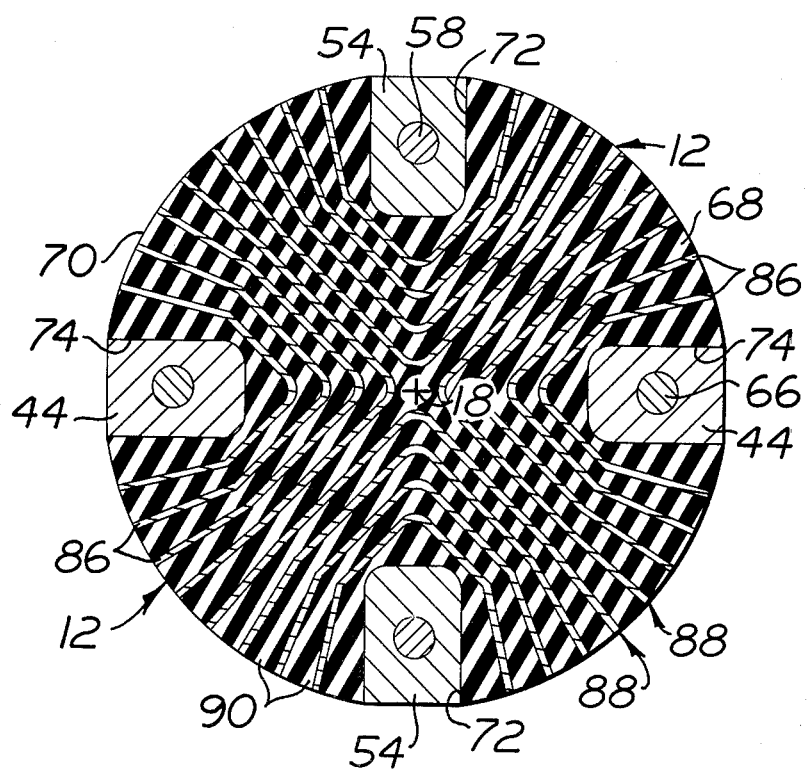

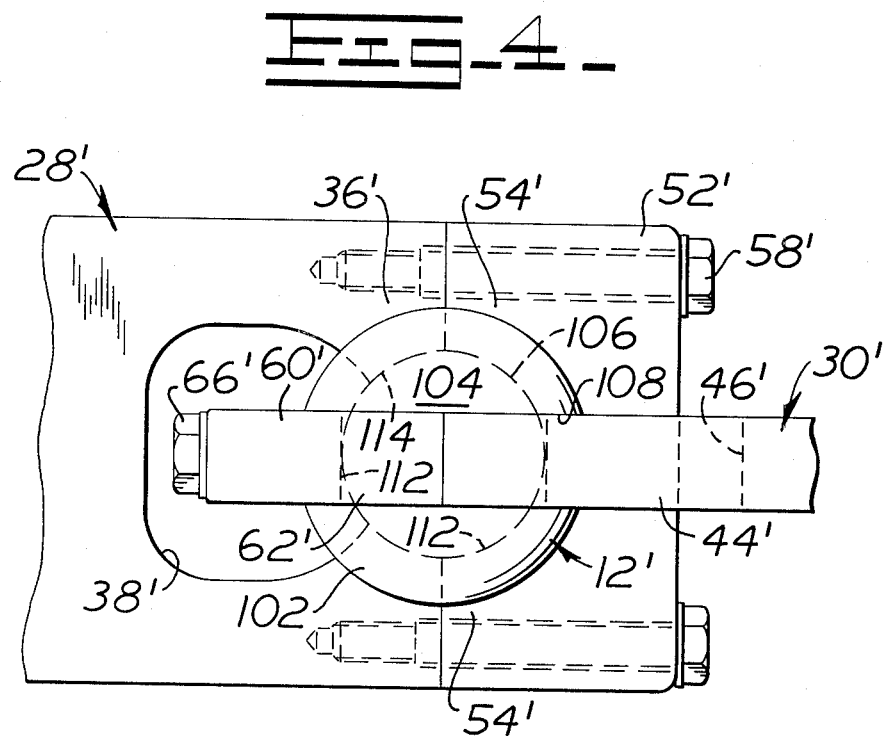
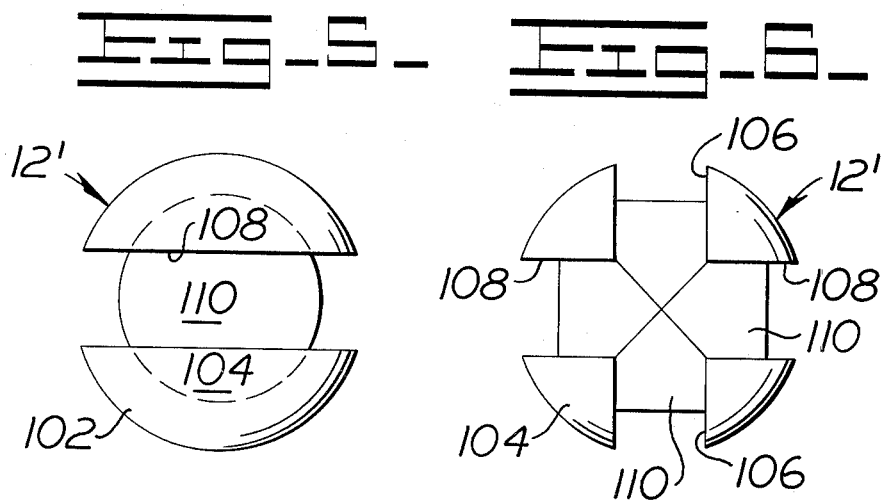

FLEXIBLE COUPLING

TECHNICAL FIELD

This invention relates generally to a flexible coupling for universal joint usage, and more particularly to a flexible coupling having resilient material in compression for connecting two shaft members and compensating for a considerable amount of angular misalignment of the shaft members.

BACKGROUND ART

Universal joints of the mechanical type are widely used for transmitting torque between a pair of rotating members. But, these universal joints require periodic servicing and maintenance, such as frequent lubrication of the bearings and connections thereof. This is especially vexatious to the truck or automobile owner, since the servicing job takes time and effort. Moreover, in many vehicular applications these joints are almost inaccessible, so that the required periodic maintenance is omitted and the life of the universal joint is greatly reduced.

For the most part, mechanical universal joints permit the transmission of power at larger angles of misalignment than is the case with flexible couplings which utilize a yieldable material in compression. On the other hand, such flexible couplings usually require no lubrication and therefore are particularly useful in locations where access is difficult. Exemplifying the art in this area are U.S. Pat. No. 3,724,239 issued Apr. 3, 1973 to M. M. Calistrat, and an article by Mr. R. R. Grundtner in the Dec. 18, 1969 issue of *Machine Design* entitled "Couplings." However, although these compression-type flexible couplings advantageously absorb drive line shocks, they suffer several disadvantages. Firstly, they are often relatively complex and costly in construction. Secondly, they are typically limited to only a few degrees of angular misalignment. Thirdly, they sometimes impose undesirable reaction loads on the connecting shaft members and their support bearings, substantially reducing the service life thereof. And fourthly, under heavy loads the elastic cushions tend to fail prematurely from fatigue or by permanent deformation.

Another type of flexible coupling is disclosed in British Patent Specification No. 1,503,110 to Regie Nationale Des Usines Renault, published Mar. 8, 1978. In that reference a grooved intermediate torque transmitting ball member of elastic or plastic material is connected by two wire ring elements individually having a head forming a practically closed circular annulus. The axes of the ring elements are at right angles to each other and are also nonintersecting or offset. However, that construction is undesirable because of the complexities evolving from such offset axes and the reduced contact area between the interlaced ring element heads and the grooves in the ball member. Not only are undesirably low load-carrying and speed capacities anticipated with that coupling, but also the ring elements must be undesirably deformed during introduction of the ball member making that construction more difficult to assemble.

The flexible coupling of the present invention is directed to overcoming one or more of the problems as set forth above.

DISCLOSURE OF INVENTION

In accordance with one aspect of the present invention, a flexible coupling is provided which has resilient body means including a plurality of reinforcement members therewithin for transferring torque and compensating for misalignment between first and second shaft members. A first arm means connects the first shaft member to the resilient body means at one end, and a second arm means connects the second shaft member to the resilient body means at the other end. Advantageously, first and second retaining means releasably and positively couple the resilient body means respectively to the first and second arm means at the opposite ends of the resilient body means.

The flexible shock-absorbing coupling of the present invention desirably has a body of flexible material disposed in compression generally between the first and second arm means, a low number of parts, a 15° angular misalignment capability, and requires no lubrication.

BRIEF DESCRIPTION OF THE DRAWINGS

FIG. 1 is an exploded, diagrammatic perspective view of the flexible coupling of one embodiment of the present invention.

FIG. 2 is an enlarged, diagrammatic, side elevational view of the embodiment of FIG. 1, with portions broken open to better show details of construction thereof.

FIG. 3 is a diagrammatic and slightly enlarged cross sectional view of the flexible coupling of FIGS. 1 and 2 as taken along line III—III of FIG. 2.

FIG. 4 is a side elevational view similar to FIG. 2, only showing a second embodiment of the present invention.

FIG. 5 is a side elevational view solely of the resilient body means of FIG. 4 to better show details of construction thereof.

FIG. 6 is an end elevational view of the resilient body means of FIG. 5.

BEST MODE FOR CARRYING OUT THE INVENTION

Referring initially to FIGS. 1 and 2, the flexible coupling 10 of one embodiment of the present invention has a centrally located resilient body means 12 for transmitting torque and compensating for misalignment between a first shaft member 14 and an opposite second shaft member 16. The resilient body means 12 has a longitudinal central axis 18, opposite first and second ends 20,22, and first and second channel means 24,26 oriented substantially parallel to the central axis at right angles to each other and extending fully between the opposite ends.

In order to releasably and positively connect the shaft members 14,16 to the resilient body means 12, first and second arm means 28,30 and first and second retaining means 32,34 are provided. The first arm means 28 preferably includes a pair of generally longitudinally oriented arms 36 connected to or integral with the first shaft member 14 and defining a profiled notch 38 and a pair of shoulders 40 between the arms at the base thereof. In the instant example, each of the arms 36 has a generally rectangular cross section and is provided with a threaded bore 42 centrally thereof. Likewise, the second arm means 30 preferably includes a similar pair of arms 44 connected to or integral with the second shaft member 16, a profiled notch 46, a pair of shoulders 48, and a pair of threaded bores 50.

The first retaining means 32 preferably includes a generally U-shaped retaining cap 52 defining a bight portion 53 and a pair of arms 54 longitudinally alignable with the arms 36 and having the same general cross section. A longitudinally oriented bore 56 extends through each of the arms 54 to permit a fastener or bolt 58 to extend therethrough for screw threaded engagement with one of the threaded bores 42. In a similar manner, the second retaining means 34 includes a retaining cap 60 having a bight portion 61, a pair of arms 62, a pair of bores 64, and a pair of fasteners or bolts 66 extendable through the bores 64 for engagement in the threaded bores 50 of the opposite shaft member.

More specifically, the resilient body means 12 includes an elastomeric body 68 having an interrupted external cylindrical surface 70. Moreover, the first channel means 24 includes an opposite pair of radially outwardly facing longitudinal channels 72 which are generally U-shaped in cross section to receive the first arms 36,54, and the second channel means 26 includes an opposite pair of similar channels 74 to receive the second arms 44,62. Preferably, for axial compactness, a first end channel 76 is defined in the first end 20 of the elastomeric body for substantially fully receiving the bight portion 61 of the retaining cap 60, and a similar second end channel 78 is defined in the opposite end 22 for substantially fully receiving the bight portion 53 of the other retaining cap 52. In this way the caps do not extend longitudinally outwardly from a geometric center 80 of the flexible coupling 10 beyond the first and second ends 20,22 of the elastomeric body.

In addition, the elastomeric body 68 also preferably defines a pair of spaced recesses 82 at each end 20,22 intercommunicating the first and second end channels 76,78 and the respective pair of longitudinal channels 72,74 and having a width similar to that of the longitudinal channels. As representatively shown in the broken open portion of FIG. 2, each recess 82 is bounded in part by a root or end bearing surface 84 which is adapted to be contacted by the shoulders 40 and 48 of the first and second arm means 28,30.

Referring now to the cross sectional view of the resilient body means 12 illustrated in FIG. 3, it may be noted to include a plurality of metallic reinforcement members 86 arranged in spaced apart relation through the elastomeric body 68 in a direction substantially parallel to the central axis 18. In the instant example, the reinforcement members 86 are preferably arranged in a plurality of formed metallic reinforcement sheet sets 88, with each set encompassing or surrounding a single one of the longitudinal channels 72,74. Each of the sheet sets 88 includes a plurality of spaced apart, but nested channular sheets of progressingly larger size radially inwardly toward the axis 18 and away from the arms 44, 54, etc. These sheets are preferably equally spaced apart between the channels at the outer cylindrical surface 70, and are preferably each bent to a substantially radial orientation with respect to the central axis at a preselected distance from the axis corresponding generally to the base of the channels 72,74. Each of the metallic reinforcement members 86 is bonded or otherwise firmly secured to a plurality of elastomeric layers or resilient members 90 which are appropriately constructed to fill the varying spaces between the reinforcement members of the sheet sets.

A second embodiment of the present invention is shown in FIGS. 4 through 6 and is similar to the first embodiment of FIGS. 1 through 3, except that a resilient body means 12' is provided that is substantially spherical in overall construction. Particularly, the resilient body means 12' includes a spherical body 102 having an external spherical surface 104 interrupted by first and second pairs of radially outwardly facing and longitudinally oriented channels 106,108 at right angles to one another as is apparent when viewing FIGS. 5 and 6. Each of the channels 106,108 is defined in part by a bottom or root surface 110 which is preferably defined as a portion of a cylindrical surface. Like the first embodiment, the first pair of arms 36' and the associated retaining cap arms 54' are seated within the first pair of channels 106, and the second pair of arms 44' and the retaining cap arms 62' are seated within the second pair of channels 108. Thus, the retaining caps 52' and 60' have semi-cylindrical internal surfaces 112 seated against the corresponding root surface 110, and the retaining caps have freedom of movement within the profiled notches 38' and 46' provided in the first arm means 28' and second arm means 30'. With this construction the arms 36' and 44' have only cylindrical surface portions or pairs 114 as representatively shown in FIG. 4 for mating engagement with the root surfaces 110.

Industrial Applicability

The flexible coupling 10 is particularly useful as a replacement for a conventional U-joint in a vehicle, such as in the drive line of a track-type tractor. It is useful, for example, in those areas of a vehicle that are inaccessible for periodic maintenance and where a considerable amount of axial misalignment must be accommodated.

In operation, and as is best appreciated by reference to FIGS. 1 and 2, the first and second retainer means 32,34 are axially inserted in the first and second channel means 24,26 from the opposite ends 20,22 of the resilient body means 12 and at a 90° angle from each other until the bight portions 53,61 are fully received in the end channels 78,76 and contact the end bearing surfaces 84. This subassembly can then be inserted into the first shaft member 14 until the shoulders 40 contact the end bearing surface 84, whereupon the bolts 58 can be screwthreadably installed through the aligned arms 54,36 so that the first retaining cap 52 is firmly secured to the first shaft member. The second shaft member 16 is then inserted axially into the remaining channel means and contact made between the shoulders 48 and the end surface 84, whereupon the other bolts 66 are screwthreadably used to secure the second retaining cap 60 to the second shaft member.

Torque is introduced into the flexible coupling 10 as by rotation of the first shaft member 14 so that, for example, the arms 36,54 can move in a clockwise direction when viewing FIG. 3. The elastomeric material 68 of the resilient body means 12 is thereby compressed between the first set of arms 36,54 and the juxtaposed second set of arms 44,62, with the reinforcement members 86 serving to better distribute loads therebetween and to better retain the elastomeric material against the action of high centrifugal forces. The material in compression thereby transmits torque in the same clockwise direction to the second shaft member 16, while simultaneously automatically absorbing dynamic shocks and minimizing the transmission of noise since there is no direct metal-to-metal connection between the connected shaft members.

As best shown in FIG. 2, the flexible coupling 10 is effective to permit a considerable amount of axial misalignment between the shaft members 14 and 16. Particularly, the flexible coupling can accommodate up to about a 15° driving angle or degree of axial misalignment between the shaft members as is indicated by broken lines in the drawing. During accommodating such movement it is of substantial significance to note that the retaining cap 60, for example, is advantageously free to rock or pivot about the geometric center 80 of the resilient body means 12 within the clearance provided by the profiled notch 38.

The second embodiment resilient body means 12' shown in FIGS. 4 through 6 operates substantially as previously described, and is of more economical construction. The second embodiment can be axially shorter than the first embodiment and can be useful, for example, in those less severe working applications wherein the maximum operating speed and torque transmission capacity are considerably lower than that of the first embodiment. Preferably, the second embodiment would also be strengthened internally by the introduction of suitable reinforcement members like the first embodiment, but not shown, to increase its capacity.

It is thus apparent that the flexible couplings 10 are simple and economical in construction, are substantially maintenance free, and can accommodate both shock loading and a considerable degree of misalignment. Furthermore, they are easy to assemble and disassemble in place on a vehicle.

Other aspects, objects, and advantages of this invention can be obtained from a study of the drawings, the disclosure, and the appended claims.

What is claimed is:

1. A flexible coupling (10) for connecting first and second shaft members (14,16), comprising:

resilient body means (12) for transmitting torque and compensating for misalignment between the first and second shaft members (14,16), said resilient body means (12) including an elastomeric body (68) having a central axis (18), opposite first and second ends (20,22), and a plurality of reinforcement members (86) arranged within the elastomeric body (68), each reinforcement member (86) being oriented in a direction substantially parallel to the axis (18);

first arms means (28) for connecting the first shaft member (14) interlockingly to said resilient body means (12) at said first end (20);

second arm means (30) for connecting the second shaft member (16) interlockingly to said resilient body means (12) at said second end (22);

first retaining means (32) for releasably coupling said resilient body means (12) to said first arm means (28) at said second end (22); and second retaining means (34) for releasably coupling said resilient body means (12) to said second arm means (30) at said first end (20).

2. The flexible coupling (10) of claim 1 wherein said elastomeric body (68) defines first and second passage means (24,26) for respectively receiving said first and second arm means (28,30), and said reinforcement means (86) individually encompass a single one of said first and second passage means (24,26).

3. A flexible coupling (10) for connecting first and second shaft members (14,16) comprising:

resilient body means (12) for transmitting torque and compensating for misalignment between the first and second shaft members (14,16) said resilient body means (12) including an elastomeric body (68) having a central axis (18), opposite first and second ends (20,22), first and second pairs of radially outwardly facing channels (72,74) and a plurality of internal metallic reinforcement members (86) arranged in sets (88), each set (88) encompassing a single one of said channels (72,74);

first arm means (28) for connecting the first shaft member (14) interlockingly to said resilient body means (12) at said first end (20);

second arm means (30) for connecting the second shaft member (16) interlockingly to said resilient body means (12) at said second end (22);

first retaining means (32) for releasably coupling said resilient body means (12) to said first arm means (28) at said second end (22); and second retaining means (34) for releasably coupling said resilient body means (12) to said second arm means (30) at said first end (20).

4. A flexible coupling (10) for connecting first and second shaft members (14,16) comprising:

a cylindrical resilient body (12) having a central axis (18), opposite first and second ends (20,22), and first and second sets of outwardly opening channels (24,26);

a plurality of reinforcement members (86) located within the resilient body (12) and arranged in spaced apart relation in a direction parallel to said axis (18);

a first set of arms (28) connected to the first shaft member (14) and received in said first set of channels (24) at said first end (20);

a second set of arms (30) connected to the second shaft member (16) and received in said second set of channels (26) at said second end (22);

a first retaining device (32) connected to said first set of arms (28) at said second end (22) and releasably entrapping said resilient body (12); and a second retaining device (34) connected to said second set of arms (30) at said first end (20) and releasably entrapping said resilient body (12).

5. The flexible coupling (10) of claim 4 wherein each of said first and second sets of channels (24,26) includes two channels (72,74) and the reinforcement members (86) are arranged in a plurality of formed metallic reinforcement sheet sets (88), with each sheet set encompassing a single one of said channels (72,74).

6. The flexible coupling (10) of claim 4 wherein the reinforcement members (86) are arranged in a plurality of sets (88), each set (88) including a plurality of spaced apart and nested channnular sheets of progressively larger size.

* * * * *